United States Patent [19]

Nomizu

[11] Patent Number: 5,297,220
[45] Date of Patent: Mar. 22, 1994

[54] IMAGE PROCESSING SYSTEM FOR IMAGE COMPRESSION AND DECOMPRESSION

[75] Inventor: Yasuyuki Nomizu, Ebina, Japan
[73] Assignee: Ricoh Company, Ltd., Tokyo, Japan
[21] Appl. No.: 933,655
[22] Filed: Aug. 24, 1992
[30] Foreign Application Priority Data
  Aug. 28, 1991 [JP] Japan .................................. 3-240288
[51] Int. Cl.$^5$ .............................................. G06K 9/36
[52] U.S. Cl. ....................................... 382/56; 358/430
[58] Field of Search ....................... 382/30, 56, 36, 27, 382/39; 358/426, 261.2, 430, 456

[56] References Cited

U.S. PATENT DOCUMENTS

| | | | |
|---|---|---|---|
| 4,325,085 | 4/1982 | Gooch | 358/261.2 |
| 4,425,582 | 1/1984 | Kadakia et al. | 358/430 |
| 4,533,957 | 8/1985 | Iinuma | 358/261.2 |
| 4,901,363 | 2/1990 | Toyokawa | 358/261.2 |

*Primary Examiner*—David K. Moore
*Assistant Examiner*—D. R. Anderson
*Attorney, Agent, or Firm*—Oblon, Spivak, McClelland, Maier & Neustadt

[57] ABSTRACT

An image processing system for image compression and decompression includes a template making part for producing a template from an image with respect to one target pixel in the image, the template containing a prescribed number of reference pixels selected from among pixels preceding the target pixel on a plurality of scanning lines including a current scanning line, the reference pixels having respective colors which have been detected, a storage part for storing the colors of the reference pixels in the template, and a state index detector for detecting a state index of the template from the colors of the reference pixels by referring to a state index table in which correspondence between values of the state index and states of colors of the reference pixels is pre-defined, so that the image is encoded into a compressed image and the compressed image is decoded into a reconstructed image in accordance with the thus detected state index of the template.

10 Claims, 10 Drawing Sheets

| A | B | C | D | E | F | G | H |
|---|---|---|---|---|---|---|---|
| R10 | R11 | R17 | R3 | R9 | R12 | R4 | R16 |

| A | B | C | D | E | F | G | H | STATE INDEX |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 1 |
| 1 | 1 | 0 | 0 | 0 | 0 | 0 | 0 | 2 |
| - | - | - | - | - | - | - | - | - - - - |
| 0 | 0 | 0 | 0 | 0 | 0 | 0 | 1 | 255 |

| STATE INDEX | Qe STATE | MPS |
|---|---|---|
| 0 | 0 | 0 |
| 1 | 0 | 0 |
| 2 | 0 | 0 |
| ⋮ | ⋮ | ⋮ |
| 255 | 0 | 0 |

FIG.12

| R1 | R2 | R3 | D | R5 | R6 | R7 |
|----|----|----|---|----|----|----|
| R8 | R9 | A | B | E | R13 | R14 |
| R15 | F | C | X | | | |

FIG.13

| | | H | D | | | |
|---|---|---|---|---|---|---|
| | G | A | B | E | | |
| | | F | C | X | | |

FIG.14

| A | B | C | D | E | F | G | H |
|---|---|---|---|---|---|---|---|
| (R10) | (R11) | (R17) | (R4) | (R12) | (R16) | R9 | R3 |

IMAGE PROCESSING SYSTEM FOR IMAGE COMPRESSION AND DECOMPRESSION

BACKGROUND OF THE INVENTION

The present invention generally relates to an image processing system for image compression and decompression, and more particularly to an image processing system for image compression and decompression in which a template adaptable to arithmetic encoding and decoding processes is produced from an image to be processed with respect to each pixel so that the image is encoded into a compressed image and the compressed image is decoded into a reconstructed image by using the template.

Figure 1:
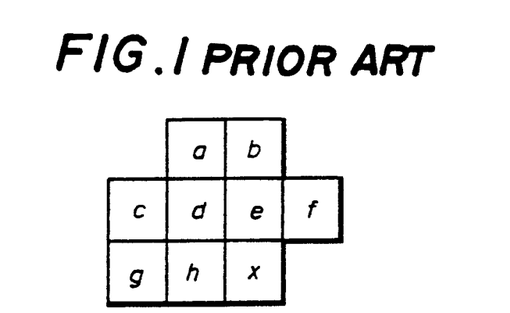
FIG. 1 is a diagram showing a template used for encoding a bi-level image in a conventional coding process.

In order to compress image data obtained through raster scanning of an original document, several coding methods are commonly used: the Modified Huffmann (MH) coding method and the Modified READ (MR) coding method, the standard coding methods intended for use with G3 facsimile apparatus; and the Modified MR (MMR) coding method, the standard coding method intended for use with G4 facsimile apparatus. A predictive coding method is also one of such coding methods, but it is a non-standard coding method. In this conventional method, a template is used to predict the color for a target pixel of an image in the image coding process FIG. 1 shows an example of the template used by the conventional predictive coding system. In FIG. 1, a target pixel of an image to be processed is labeled as "x", while eight pixels preceding the target pixel "x" as the reference pixels are labeled as "a" through "h". The colors for the reference pixels "a" through "h" are detected with respect to each target pixel in the image. In a case where a template including eight reference pixels is used, 256 different states of colors of the reference pixels (Markov conditions) are definable with respect to one target pixel. A particular state of the colors of the reference pixels is identified by a state index, the state index in the above case ranging from 0 to 255. The template used in the predictive coding method is a set of data including relative locations of the reference pixels surrounding the target pixel.

Because the probability of occurrence of color for the target pixel is closely related with the state of colors for the reference pixels in the template, a predicted probability of color for the target pixel can be determined according to the state of colors of the template. For example, if all the colors for the reference pixels surrounding the target pixel are white, white is the color which most probably occurs for the target pixel. The probabilities of color occurrences for picture elements are generally predetermined via a statistical method by observing the colors of the reference pixels in the template.

In the predictive coding method described above, a coincidence between the predicted color of the target pixel being predicted through the template and the actual color of the target pixel is detected with respect to each of the pixels of an image. Then, a stream of data including state index data and coincidence data is produced: the state index data indicating a state of colors of pixels in each template, and the coincidence data indicating a condition of coincidences between the predicted colors and the actual colors. A run-length coding process is performed by repeatedly detecting one state index and one coincidence data from the stream of data so that the original image can be compressed.

The predictive coding process can be efficiently performed if the state index data for all the target pixels is stored in a memory and the run-length coding process is performed by detecting the state index data stored in the memory. However, it is necessary to store the stream of data indicating coincidence between the predicted color and the actual color sequentially in the order of the pixels being detected in order to efficiently perform the predictive coding process. Thus, there is a problem in that the size of the coding system becomes large because the memory for storing a large amount of data is required, and thus it is difficult to accomplish real-time processing of the image compression or decompression.

In order to eliminate the above described problem and to improve the efficiency of the coding process, a combined coding method in which the predictive coding method and an arithmetic coding method are combined has been proposed.

Conceptually, the basis for the arithmetic coding method is a recursive probability interval division. An input sequence of symbols is mapped into a real number "x" on the interval [0.0, 1.0) where a square bracket on the left-hand end of the interval denotes equality being allowed and a curved bracket on the right-hand end thereof denotes equality being disallowed. In the arithmetic coding method, the binary expansion of the real number "x" is transmitted or stored instead of the original sequence of symbols. A QM-coder which utilizes the concept of the arithmetic coding method has been proposed.

Figure 2:
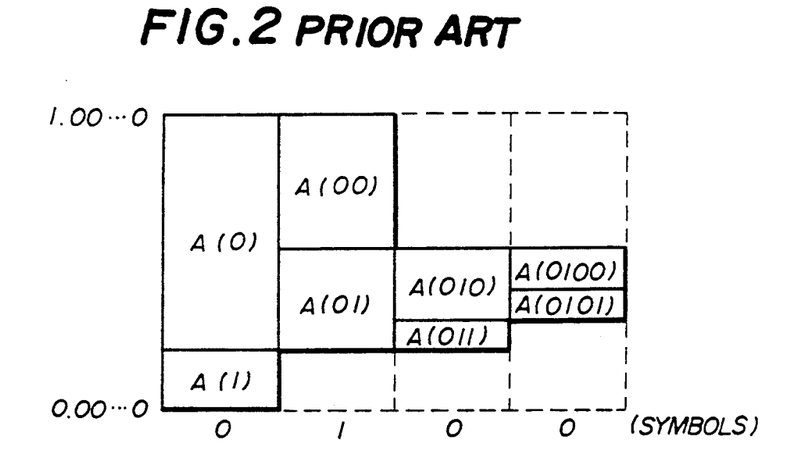
FIG. 2 is a diagram for explaining an arithmetic encoding process performed with respect to bi-level image data.

FIG. 2 shows an example of such an interval division through an initial sequence of symbols 0, 1, 0, 0 to be coded. The portion of [0.0, 1.0) on which x is known to lie after coding an initial sequence of symbols is known as the current coding interval. For each binary input the current coding interval is divided into two sub-divisions with sizes proportional to the relative probabilities of symbol value occurrences. The new current coding interval becomes that associated with the symbol value which has actually occurred. In an encoder, knowledge of the current coding interval is maintained in a variable giving its size and a second variable giving its base. The output stream is obtained from the variable pointing to the base.

In FIG. 2, when a first symbol is encoded, the current coding interval [0.0, 1.0) is divided into two sub-intervals A(0) and A(1) according to the probabilities of symbol occurrences. If the symbol "0" actually occurs in a sequence of symbols, the sub-interval A(0) is selected and this sub-interval becomes the current coding interval. Then, when a second symbol is encoded, the current coding interval A(0) is divided into two sub-intervals A(00) and A(01) according to the probabilities of symbol occurrences. If the symbol "1" actually occurs, the sub-interval A(01) is selected and this sub-interval becomes the current coding interval. The above procedures are repeated until the end of the sequence of symbols is encoded.

When the current coding interval is partitioned into two sub-intervals, the sub-interval for the less probable symbol (LPS) is placed in an order higher than that of the sub-interval for the more probable symbol (MPS). Therefore, when the LPS is coded, the MPS sub-interval is added to the base. This coding procedure requires that symbols be recognized as either MPS or LPS, rather than 0 or 1. Consequently, the size of the LPS interval and the sense of the MPS for each symbol must be known in order to code that symbol. Because the code stream always points to a real number in the current coding interval, the decoding process is a matter of determining, for each decision, which sub-interval is being pointed to by the code stream. This procedure is also done recursively, using the same interval sub-division process as in the case of the encoder. Each time a decision is decoded, the decoder subtracts any interval which is added to the code stream by the encoder. Therefore, the code stream in the decoder indicates the current coding interval relative to the base of the current coding interval. Because the coding process involves addition of binary fractions rather than concatenation of integer code words, the more probable binary decisions can often be coded at a cost of much less than one bit per decision.

In the predictive coding process, the probability of symbol occurrence in the stream of symbols is varied according to the state index (or the context). The arithmetic coding method is suitable for such a coding process, as the use of such a method makes it possible to reduce the size of hardware or the capacity of the required memories and increase the efficiency of the coding process. Also, the arithmetic coding method is advantageous in that adaptive implementation as regards the existing image processing system is easy. A QM-coder is devised so as to efficiently perform the above mentioned arithmetic coding process using small sized hardware.

As described above, in the arithmetic coding process, if the .MPS frequently occurs in the stream of symbols, the coding intervals for the symbols become wide and the amount of the data to be processed is reduced so that the efficiency of the coding process is increased. Conversely, if the LPS frequently occurs in the stream of symbols, the coding intervals become narrow and the amount of the data to be processed is increased so that the efficiency of the coding process is lowered. In order to improve the efficiency of the arithmetic coding process, a preprocessing for increasing the frequency of the MPS occurrence is needed. The predictive coding process described above is performed for such a purpose, and it enables the predicted probability of the color for the target pixel to have a greater value.

Figure 3A:
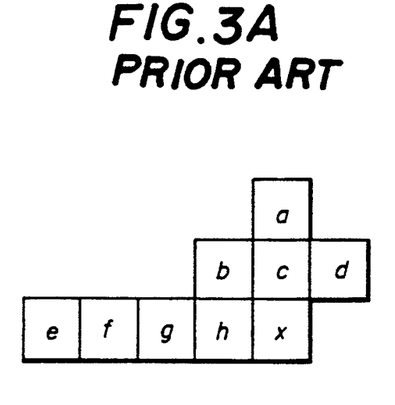
FIGS. 3A and 3B are diagrams showing, respectively, templates intended for encoding a halftone image and for encoding a composite image in which a bi-level image and a halftone image coexist.
Figure 3B:
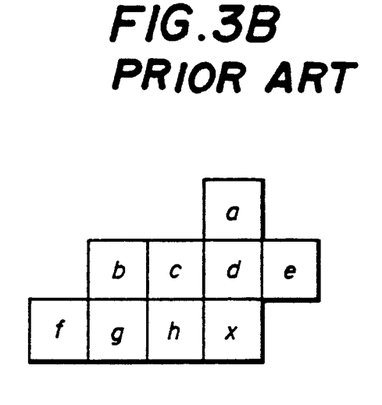

A method for making the value of the predicted probability of the color for the target pixel greater is to produce and use a template for recognizing the characteristics of image data to be coded. For example, the template shown in FIG. 1 is suitable for use in the preprocessing of a bi-level image (a black-white image) such as a character. FIG. 3A shows a template which is suitable for use in the preprocessing of a halftone image such as a photograph. FIG. 3B shows a template which is suitable for use in the preprocessing of a composite image in which a bi-level image and a halftone image coexist.

However, in the prior art, there is no appropriate method for preparing a template for recognizing the characteristics of local portions of an image to be encoded or decoded. Hence, it is difficult to enable the efficiency of the coding process to be increased without seriously degrading the picture quality. For example, an image which is reproduced from a black-white image such as a character may have a faded portion like a halftone image when the reproduced image is printed on a copy sheet in a poor printing condition. The location at which the faded portion appears and the halftone level thereof depend on the characteristics of the original image being processed. However, there conventionally is no appropriate method for preparing a template for recognizing the characteristics of the local portions of the image data so as to increase the efficiency of the encoding or decoding process.

SUMMARY OF THE INVENTION

Accordingly, it is a general object of the present invention to provide an improved image compression and decompression apparatus in which the above described problems are eliminated.

Another, more specific object of the present invention is to provide an image processing apparatus in which an image is efficiently encoded by means of a template for recognizing the characteristics of the local portions of the image so that a high quality compressed image is generated from the image. The above mentioned object of the present invention is achieved by an image processing system which includes a template making part for carrying out a template producing process so that a template is produced from an image with respect to one target pixel in the image, the template containing a prescribed number of reference pixels selected from among an array of pixels preceding the target pixel on a plurality of scanning lines including a current scanning line, the reference pixels having respective colors which have been detected, a storage part for storing the colors of the reference pixels in the template produced by the template making part, a state detection part for detecting a state index of the template from the colors of the reference pixels stored in the storage part by referring to a state index table in which correspondence between values of the state index and states of colors of the reference pixels is pre-defined, and an encoding part for encoding the target pixel by carrying out an arithmetic encoding process in accordance with the state index detected by the state detection part, so that a compressed image is generated from the image. In this image processing system, the template producing process carried out by the template making part includes steps of: counting the number of color coincidences between a color of one of the pixels in the array and a color of the target pixel with respect to each of the pixels in the array; repeating the counting step until a count number which is the same as the number of pixels on the successive scanning lines is reached; selecting one reference pixel having a maximum count number of color coincidences from among the pixels in the array; updating a corresponding template data of the template table by the maximum count number of the selected reference pixel; repeating the selecting and updating steps until all template data corresponding to the prescribed number of reference pixels are updated in the template table; and storing the template table in the storage part, each of the colors of the reference pixels being described by corresponding template data in the template table.

Still another object of the present invention is to provide an image processing apparatus in which an image is efficiently decoded by means of a template for recognizing the characteristics of the local portions of the image so that a high quality reconstructed image is generated from the image. The above mentioned object of the present invention is achieved by an image processing system which includes a template making part for carrying out a template producing process so that a template is produced from an image with respect to one target pixel in the image, the template containing a prescribed number of reference pixels selected from among an array of pixels preceding the target pixel on a plurality of scanning lines including a current scanning line, the reference pixels having respective colors which have been detected, a storage part for storing the colors of the reference pixels in the template produced by the template making part, a state detection part for detecting a state index of the template from the colors of the reference pixels stored in the storage part by referring to a state index table in which correspondence between values of the state index and states of colors of the reference pixels is pre-defined, and a decoding part for decoding the image with respect to each target pixel by carrying out an arithmetic decoding process in accordance with the state index detected by the state detection part, so that a reconstructed image is generated from the image. In this image processing system, the template producing process carried out by the template making part includes steps of: counting the number of color coincidences between a color of one of the pixels in the array and a color of the target pixel with respect to each of the pixels in the array; repeating the counting step until a count number which is the same as the number of pixels on the successive scanning lines is reached; selecting one reference pixel having a maximum count number of color coincidences from among the pixels in the array; updating a corresponding template data of the template table by the maximum count number of the selected reference pixel; repeating the selecting and updating steps until all template data corresponding to the prescribed number of reference pixels are updated in the template table; and storing the template table in the storage part, each of the colors of the reference pixels being described by corresponding template data in the template table.

According to the present invention, a template for preprocessing the characteristics of local portions of an image to be processed is prepared and used, and the efficiency of the encoding or decoding process can be increased without seriously degrading the picture quality. Also, according to the present invention, the reference pixels in the template are divided into a group of fixed reference pixels and a group of variable reference pixels. The locations of the fixed reference pixels relative to the target pixel are not changed in the template producing process. Only the variable reference pixels are updated to produce the template for use in the encoding or decoding process, thus reducing the number of pixels requiring computation in the template producing process. The efficiency of the encoding or decoding process can be increased further in a case in which a certain kind of image data is processed by the image processing system. Also, it is possible to reduce the size of the hardware and to produce an image processing system for image compression and decompression at a low cost.

Other objects and further features of the present invention will become apparent from the following detailed description when read in conjunction with the accompanying drawings.

DESCRIPTION OF THE PREFERRED EMBODIMENTS

A description will now be given of an arithmetic encoding process for compressing an image and an arithmetic decoding process for decompressing a compressed image, performed by the QM-coder to which the present invention is applied.

Figure 4A:
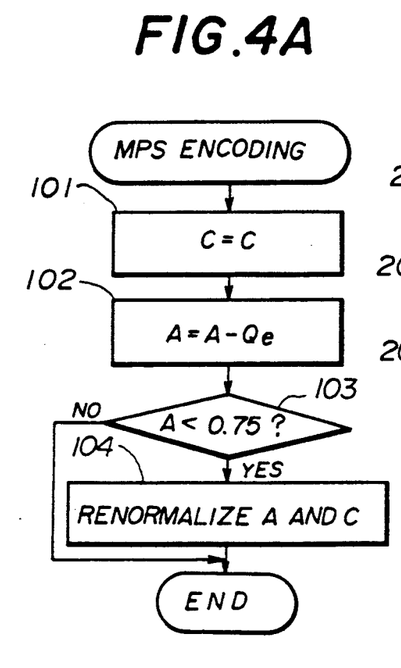
FIGS. 4A and 4B are flow charts for explaining an arithmetic encoding process.
Figure 4B:
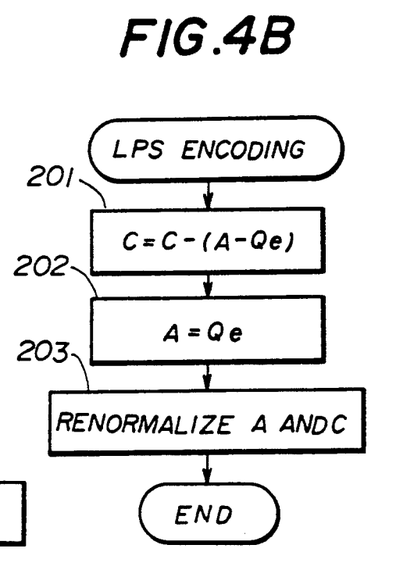
Figure 4C:
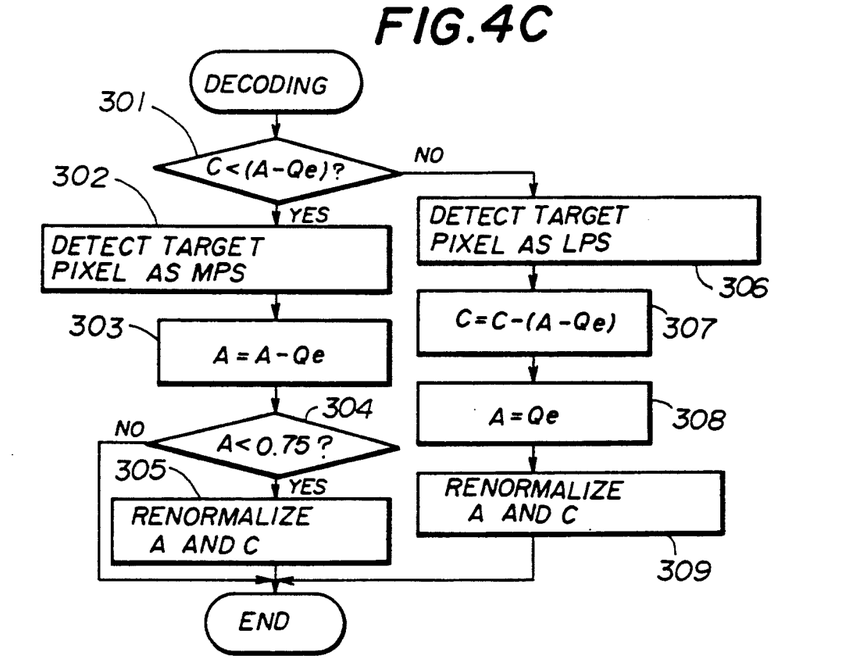
FIG. 4C is a flow chart for explaining an arithmetic decoding process.

In the arithmetic encoding process, it will now be assumed that a line segment having a length "x" ($0 \leq x < 1$) is known as the current coding interval, as mentioned above. In FIGS. 4A through 4C, "A" denotes an initial value of the current coding interval as a variable, and a first register A contains the value of the current coding interval. "Qe" denotes an estimated probability of the less probable symbol LPS. The current coding interval is repeatedly divided into two subintervals in the arithmetic coding process. In the course of such interval division, a value "a" of the sub-interval for the more probable symbol MPS occurring in the stream of symbols and a value "b" of a sub-interval for the LPS occurring in the stream of symbols are determined as follows.

$$a = A(1-Qe), b = A Qe \quad (1)$$

When a symbol occurring in the stream of symbols is 0 (=MPS), the interval value "A" is set to "a" which is obtained according to the formula (1). When the symbol occurring in the stream of symbols is 1 (=LPS), the interval value "A" is set to "b" obtained according to the formula (1). The interval division procedure is repeated until the symbol stream ends.

However, the use of multiplication in computing the interval value as in the formula (1) is disadvantageous as regards the coding speed and the cost of hardware. When the encoding process is performed for a very long symbol stream, a register which stores data having an indefinite length is needed for computing a very small value of the coding interval. For this reason, an approximation of the above formula (1) is used, and such approximated formula is actually used by the QM-coder. In the QM-coder, after the interval division is performed, values of the sub-intervals always lie in the range between 0.75 and 1.5 in decimal numbers. The value "A" of the sub-interval is approximated to the value one so that the multiplication is omitted. Consequently, the approximation formula mentioned above is:

$$a = A - Qe, b = Qe \quad (2)$$

In the QM-coder, the first register A contains the value of the current coding interval, which value is normalized such that the length of a line corresponding to the sub-interval value always lies in the range between 0.75 and 1.5 in decimal numbers. Whenever the value of the sub-interval falls below 0.75 (decimal) as a result of a symbol being coded, a renormalization of the first register A is performed until the sub-interval value is greater than or equal to 0.75 (decimal). A second register C contains the trailing bits of the code stream. The second register C is renormalized whenever the first register A is renormalized. In order to correctly encode a stream of symbols according to the formula (2), it is necessary to renormalize the registers A and C whenever the value of A is less than 0.75 (decimal). The renormalization as mentioned above is accomplished by leftward bit shifting in the first and second registers A and C.

In FIG. 4A, an MPS encoding process for encoding the more probable symbol MPS is shown. When the MPS occurs, step 101 leaves the value C of the base in the second register C unchanged. Step 102 updates the value A of the current coding interval to a value of the sub-interval by subtracting the estimated probability Qe corresponding to the state of colors in the template (which step will be described in detail below) at that time from the current coding interval (A=A - Qe). Step 103 detects whether or not the value A of the sub-interval, contained in the first register A, is smaller than 0.75 (decimal). If A<0.75, step 104 renormalizes the first and second registers A and C in a manner such that the value of the sub-interval is greater than or equal to 0.75 (decimal). If A≧0.75, no renormalization is performed so that the value A of the sub-interval is maintained. Then, the MPS encoding process ends.

In FIG. 4B, an LPS encoding process for encoding the LPS is shown. When the LPS occurs, step 201 updates the value C of the base, contained in the second register, to a new value of the base by adding (A−Qe) to the current value C of the base. Step 202 updates the value A of the current coding interval in the first register so that it is equal to the estimated probability Qe corresponding to the state of colors in the template at that time. Step 203 renormalizes the first and second registers A and C in a manner such that the value of the sub-interval is greater than or equal to 0.75 (decimal). Then, the LPS encoding process ends. The value C of the base in the second register after the renormalization is performed accords at this time with the binary fractions indicating the lowest segment of the coding interval. After the renormalization of the registers A and C is performed by leftward bit shifting, the second register C contains the value of the base corresponding to fractions exceeding the value one.

In FIG. 4C, the arithmetic decoding process is shown. In the arithmetic decoding process, step 301 detects whether or not the value C of the base in the second register is smaller than (A−Qe). In the case of C<(A−Qe), step 302 detects the target pixel "x" in the decoding process as being the more probable symbol MPS. Step 303 updates the value A of the current coding interval to a new value of the sub-interval by subtracting the estimated probability Qe corresponding to the state of colors in the template at that time from the current coding interval (A=A−Qe). Step 304 detects whether or not the value A of the sub-interval in the first interval after the updating is smaller than 0.75 (decimal). If A<0.75, step 305 renormalizes the first and second registers A and C in a manner such that the value of the sub-interval is greater than or equal to 0.75 (decimal). If A≧0.75, no renormalization is performed so that the value A of the sub-interval is maintained. Then, the decoding process ends.

In the case where step 301 has detected that the value C of the base in the second register is greater than or equal to (A−Qe), step 306 detects the target pixel "x" in the decoding process as being the less probable symbol LPS. Step 307 updates the value C of the base in the second register to a new value by subtracting the value of (A−Qe) from the value C of the current base (C=C−(A−Qe)). Step 308 updates the value A of the current coding interval in the first register so that the value of the sub-interval is equal to the estimated probability Qe corresponding to the state of colors in the template at that time (A=Qe). Step 309 renormalizes the first and second registers A and C. Then, the decoding process ends.

In the case where the arithmetic coding process is performed, the second register updating (C) and the renormalization (A and C) are less frequently performed when the MPS occurs than when the LPS occurs. Whenever the LPS occurs, the renormalization must be performed. Therefore, if the predictive coding process is performed as the preprocessing for reducing the frequency of LPS occurrence (increasing the frequency of MPS occurrence), it is possible to efficiently perform the image coding and to increase the speed of the processing.

Next, a description will be given of a procedure for producing a template in the predictive coding process according to the present invention, with reference to FIGS. 5 through 8.

Figure 5:
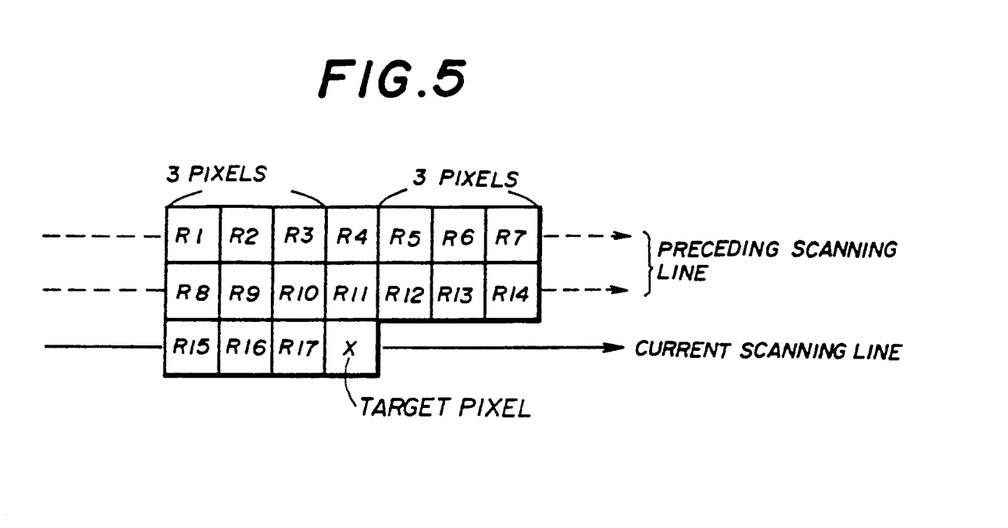
FIG. 5 is a diagram showing a region in which reference pixels are located relative to a target pixel in an image to be coded, the reference pixels being used to produce a template according to the present invention.

FIG. 5 shows a region in which reference pixels are located in an image to be coded, the reference pixels being used to produce a template in the predictive coding process. As shown in FIG. 5, the reference pixels, of which there are a total of seventeen pixels preceding the target pixel "x", consist of fourteen pixels on two preceding scanning lines (each scanning line including three pixels at positions to the left of a position corresponding to that of the target pixel, one pixel at the position corresponding to that of the target pixel, and three pixels at positions to the right of the position corresponding to that of the target pixel), and three pixels at positions to the left of that of the target pixel on the current scanning line. Counters R1 through R17 are provided, the number of which corresponds to the number of the reference pixels shown in FIG. 5.

Whenever one pixel of the image is encoded, the color for the pixel is detected. Thus, the colors for the reference pixels shown in FIG. 5 are detected. In the procedure for producing a template, each time the color for one of the reference pixels coincides with the color for the target pixel, a count value in a corresponding counter (from among the counters R1 through R17) is incremented and the count value is held by that counter. This procedure is repeated with respect to a prescribed number of pixels (e.g., all of the pixels on three successive scanning lines).

Then, the count values of the counters corresponding to the reference pixels are arrayed in ascending order from a maximum value to a minimum value. Among the reference pixels, eight pixels corresponding to the eight greatest count values of color coincidences held by the counters are respectively labeled as A through H, so that a template table is produced in which correspondence between the eight reference pixels labeled A through H and the eight greatest count values in the counters is defined.

Figure 6:
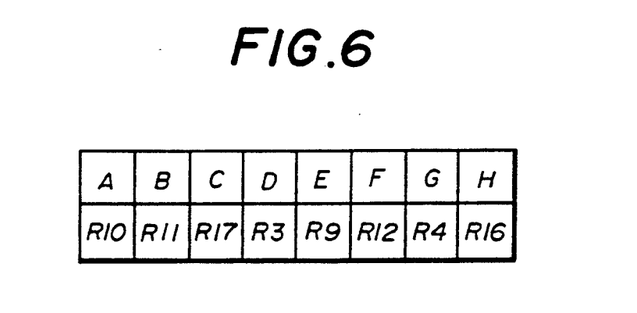
FIG. 6 is a diagram showing a template table in which correspondence between eight reference pixels labeled A through H (from among the reference pixels shown in FIG. 5) and eight count values of color coincidences in corresponding counters are stored.
Figure 7:
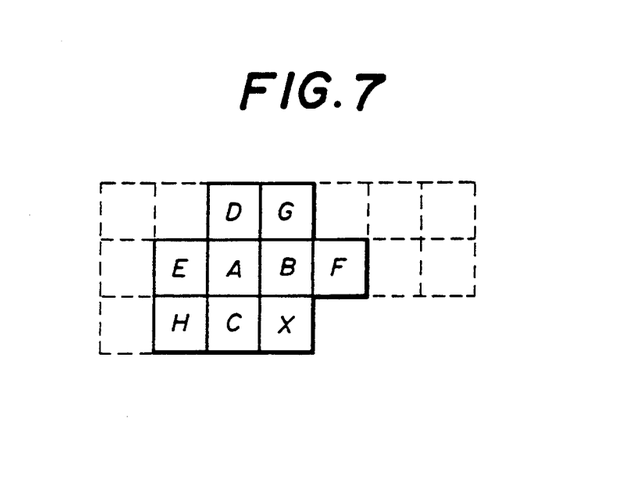
FIG. 7 is a diagram showing a template which is produced in accordance with the content of the template table shown in FIG. 6.
Figure 8:
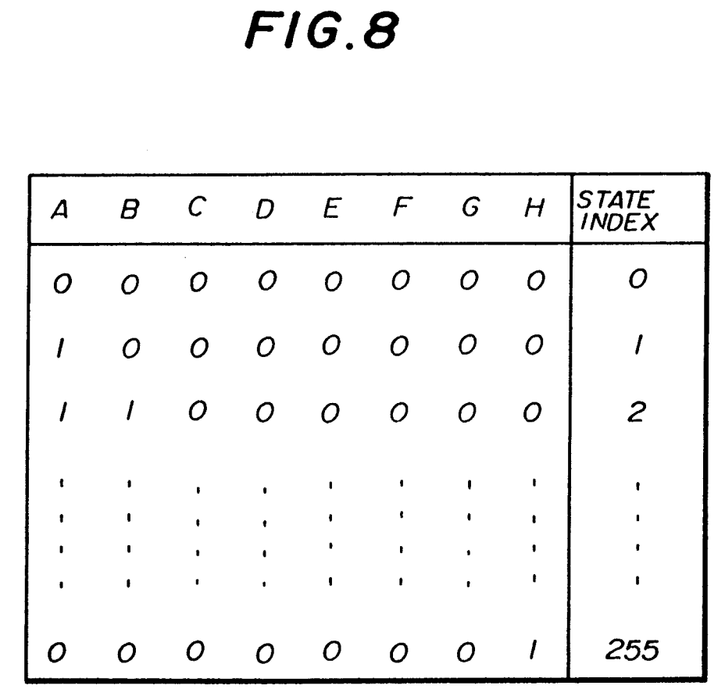
FIG. 8 is a diagram showing a state index table in which correspondence between state index and 256 different states of colors for the eight reference pixels A through H is defined.

FIG. 6 shows an example of such a template table which is produced in the manner described above. FIG. 7 shows an example of a template which is produced in accordance with the template table shown in FIG. 6. In the template shown in FIG. 7, the counter R10 corresponding to the pixel A has the maximum count value, and the counters R11, R17, R3, R9, R12, R4, and R16 corresponding to the pixels B, C, D, E, F, G, and H have the remaining count values which are arranged in ascending order. FIG. 8 shows a state index table in which correspondence between the state index and each of 256 states of colors for the eight reference pixels A through H is pre-defined.

As described in the foregoing, it is possible to produce a template for recognizing the characteristics of local portions of image data by repeating the above procedure with respect to pixels on three successive scanning lines in the predictive coding process. When the predictive coding process has just started, the template shown in FIG. 7 and the template shown in FIG. 6 are used as the initial values of the template.

Figure 9:
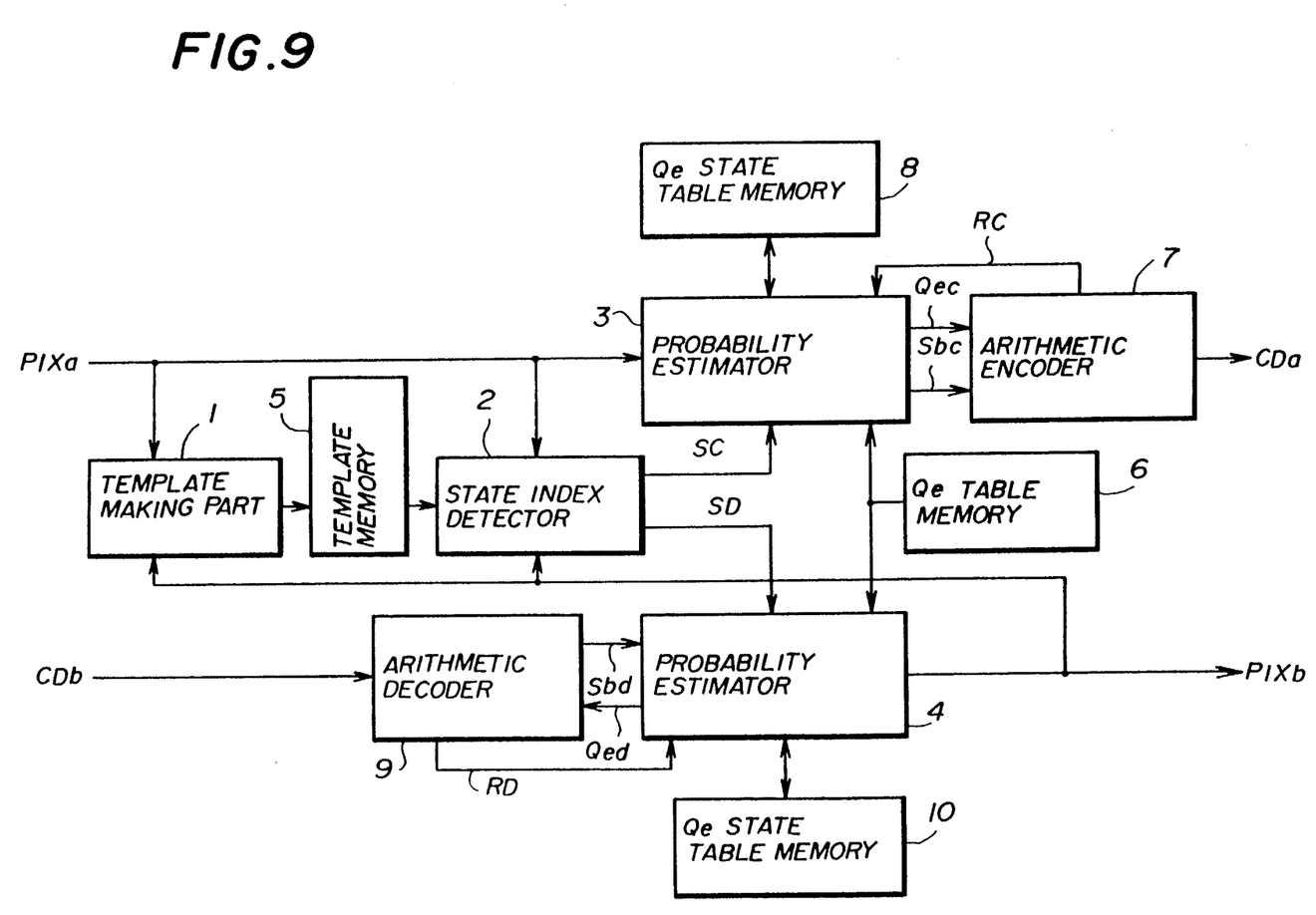
FIG. 9 is a block diagram showing an image compression and decompression apparatus according to the present invention.

Next, a description will be given of an image compression and decompression system according to the present invention, with reference to FIG. 9. In FIG. 9, image data PIXa indicating an original image is supplied by an image reader (not shown) to a template making part 1, a state index detector 2, and a probability estimator 3. Also, image data PIXb indicating a reconstructed image is supplied by a probability estimator 4 to an external unit, the template making part 1, and the state index detector 2.

After the image data PIXa is received by the template making part 1, this part produces a template by performing the above described procedure so that the template is used for encoding the image data. After the image data PIXb is received by the template producing part 1, this part produces a template based on the image data PIXb in a manner similar to that described above regarding the image data PIXa. During the template producing process, a template table is produced by the template making part 1 and this template table is stored in a template memory 5.

After the image data PIXa and template data according to the template table stored in the template memory 5 are received in the encoding process, the state index detector 2 detects a state index with respect to each pixel of the image data PIXa by referring to a predetermined state index table in accordance with the received template data. This state index indicates a state of color for each target pixel being selected from among various states of colors in the template, as in the state index table shown in FIG. 8. A signal SC indicating the state index detected by the state index detector 2 is input to the probability estimator 3 with respect to each pixel of the image data in the encoding process.

Also, after the image data PIXb and the template data according to the template table in the template memory 5 are received in the decoding process, the state index detector 2 detects a state index with respect to each pixel of the image data PIXb by referring to the predetermined state index table in accordance with the received template data. A signal SD indicating the state index detected by the state index detector 2 is input to the probability estimator 4 with respect to each pixel of the image data in the decoding process.

In a probability estimation table memory 6, a probability estimation table (Qe Table) is stored which defines a set of standard estimated probability data corresponding to 113 different states of colors for a stream of symbols indicated by picture elements. The probability estimators 3 and 4 can have access to the data of the Qe Table stored in the probability estimation table memory 6. The standard estimated probability data in the Qe Table of the probability estimation table memory 6 must be predetermined in accordance with the existing International Standard.

After the image data PIXa and the signal SC are received in the encoding process, the probability estimator 3 detects an estimated probability of symbol occurrence and the type of the symbol with respect to each pixel of the image data PIXa by referring to the Qe Table of the memory 6 in accordance with the state index indicated by the signal SC. In the above described detection, a Qe state data is generated by the probability estimator 3 from the state index and the content of the Qe Table, and this Qe state data is stored in a Qe state table of a Qe state table memory 8. A signal Qec indicating the estimated probability of symbol occurrence and a signal Sbc indicating the type of the symbol (either the MPS or the LPS) are input by the probability estimator 3 to an arithmetic encoder 7. Based on these signals Qec and Sbc, the color for the symbol corresponding to the target pixel is detected. Whenever the first and second registers are renormalized in the arithmetic encoder 7, a signal RC indicating occurrence of the renormalization is input by the arithmetic encoder 7 to the probability estimator 3. The signal RC is used by the probability estimator 3 to detect the estimated probability and the type of the symbol.

Figure 10:
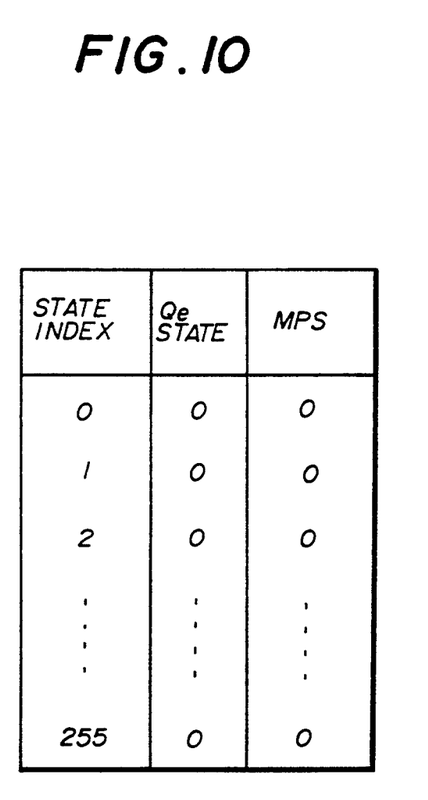
FIG. 10 is a diagram showing a Qe state table generated by the apparatus shown in FIG. 9.

FIG. 10 shows an example of the Qe state table stored in the Qe state table memory 8. In the Qe state table, the Qe state data is defined with respect to each of 256 different values of the state index. The Qe state data includes a condition data indicating a condition of the Qe Table and an MPS color data indicating a color of an MPS symbol.

After the signals Qec and Sbc are received by the arithmetic encoder 7, this encoder performs the arithmetic encoding process described above so that a code data is generated with respect to each target pixel of the image data PIXa. Whenever the first and second registers are renormalized, the signal RC is supplied by the arithmetic encoder 7 to the probability estimator 3. A signal CDa indicating the code data being generated is output by the arithmetic encoder 7 to an external unit with respect to each pixel of the image data.

After the signal SD from the state index detector 2 and a signal Sbd indicating the type of the symbol (either the MPS or the LPS) from an arithmetic decoder 9 are received in the decoding process, the probability estimator 4 detects an estimated probability of symbol occurrence with respect to each pixel of the image data PIXb by referring to the Qe Table of the memory 6 in accordance with the state index indicated by the signal SD being received from the state index detector 2. In the above detection, a Qe state data is generated by the probability estimator 4 from the state index and the content of the Qe Table, and this Qe state data is stored in a Qe state table of a Qe state table memory 10. A signal Qed indicating the estimated probability of symbol occurrence being detected is input by the probability estimator 4 to the arithmetic decoder 9. Whenever the first and second registers are renormalized in the arithmetic decoder 9, a signal RD indicating occurrence of the renormalization is input by the arithmetic decoder 9 to the probability estimator 4. Based on these signals Sbd and RD, the color of the symbol corresponding to the target pixel is detected by the probability estimator 4.

After image data CDb indicating a compressed image and the signal Qed are received by the arithmetic decoder 9, this decoder performs the arithmetic decoding process described above so that a decoded data indicating the color for each target pixel of the image data CDb is generated. Whenever the first and second registers are renormalized, the signal RD is supplied by the arithmetic decoder 9 to the probability estimator 4. A signal indicating the image data PIXb produced by the arithmetic decoder 9 is output to an external unit via the probability estimator 4 with respect to each pixel of the image data CDb. In the Qe state table of the memory 10, a Qe state data, similar to that in the Qe state table of the memory 8, is stored.

Figure 11:
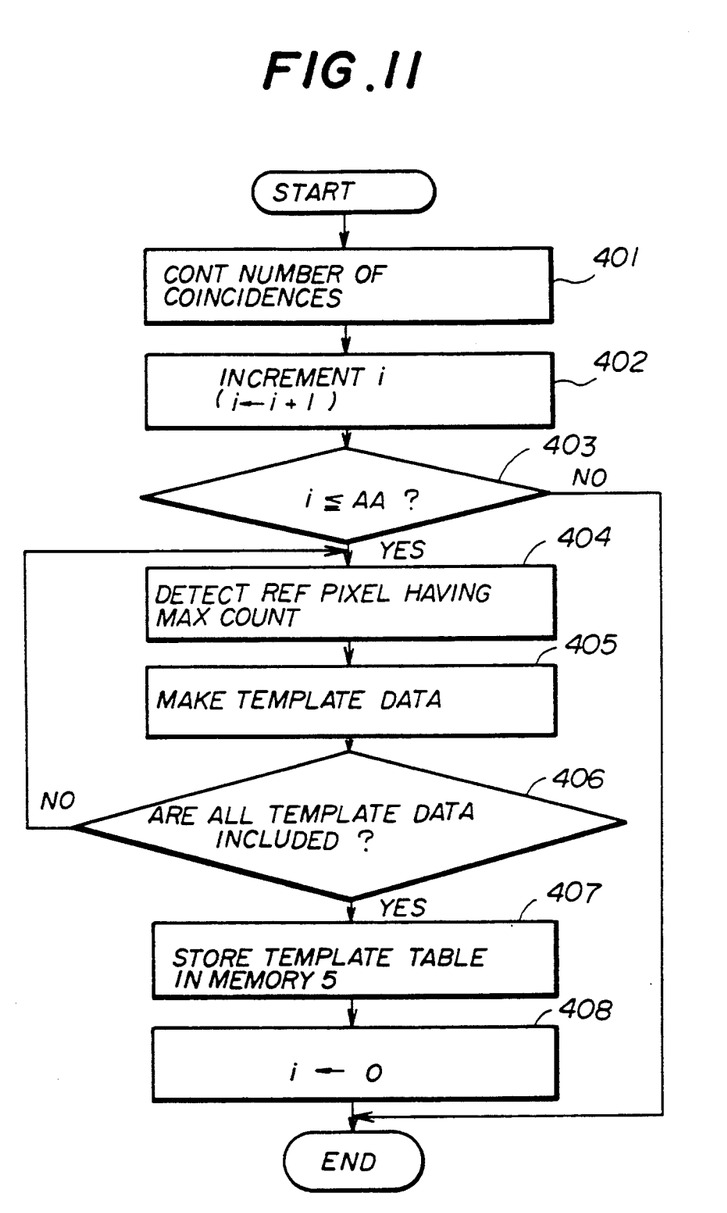
FIG. 11 is a flow chart for explaining a template producing process performed by a template making part of the apparatus of FIG. 9.

Next, a template producing process performed by the template making part 1 of FIG. 9 will be described with reference to a flow chart shown in FIG. 11.

The template making part 1 uses, with respect to one target pixel, the seventeen reference pixels (which precede the target pixel and lie on three successive scanning lines, as shown in FIG. 5) and the seventeen counters R1 through R17 corresponding to the respective reference pixels in order to produce the template described above. The colors for the reference pixels were detected in the previous encoding process before a color for the target pixel is detected. Step 401 in the template producing process of FIG. 11 increments, whenever the color for one of the reference pixels coincides with the color for the target pixel, a count value of color coincidence in a corresponding counter (from among the counters R1 through R17), and allows the counter to hold such an incremented count value therein. Step 402 increments a count value "i" ($i=i+1$) each time the step 401 is performed. This procedure is repeated with respect to a prescribed number AA of pixels lying on three successive scanning lines. Step 403 checks whether the count value "i" is smaller than or greater than the prescribed number AA.

As the result of the detection in step 403, if $i > AA$, the template producing process ends. If $i \leq AA$, the count values of the counters corresponding to the reference pixels are arrayed in ascending order from a maximum value to a minimum value. Then, step 404 detects a reference pixel corresponding to a counter having the maximum count value from among the counters R1 through R17. Step 405 places a template data with respect to one reference pixel (which is detected in step 404) into the template table at a portion thereof corresponding to the maximum count value as shown in FIG. 6. After the template data with respect to one reference pixel is placed into the template table, the counter having the maximum count value is reset so that the maximum count value held by the counter is set to zero.

Step 406 checks whether or not all the template data with respect to eight reference pixels are included in the template table. If it is detected in step 406 that any vacant portion for the template data remains in the template table, steps 404 and 405 are performed again as described above. If all the template data are included in the template table, step 407 stores a template table in the template memory 5 in accordance with the thus updated template data. Step 408 resets the count value i to zero. Then the template producing process ends as shown in FIG. 11, and the same procedure is repeated with respect to a next target pixel.

In the above described embodiment, all the reference pixels in the template are updated each time all of the pixels lying on three successive scanning lines are encoded or decoded. However, in a case in which a certain kind of image data is processed, while a few reference pixels are changed within the template, the remaining reference pixels remain unchanged throughout the coding process. In such a case, it is possible to divide the reference pixels in the template into two groups: a group of fixed reference pixels and a group of variable reference pixels. The fixed reference pixels are not subjected to the update procedure, while the variable reference pixels are subjected to the update procedure. Since the number of reference pixels being updated during the encoding or decoding process is reduced, the processing time needed to produce a template table can be shortened and the speed of the processing can be increased.

Next, a description will be given of the above mentioned case in which the reference pixels in the template are divided into two groups in order to increase the speed of encoding or decoding image data.

Figure 12:
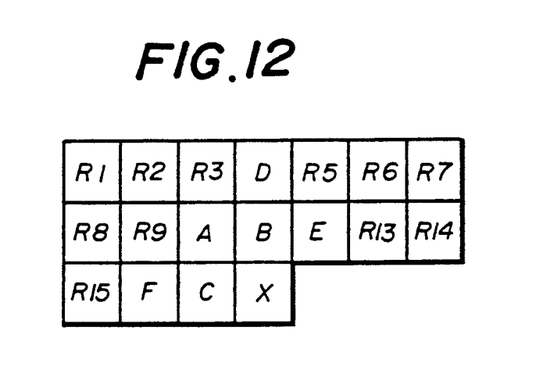
FIG. 12 is a diagram showing reference pixels of another type, which pixels are divided into two groups.
Figure 13:
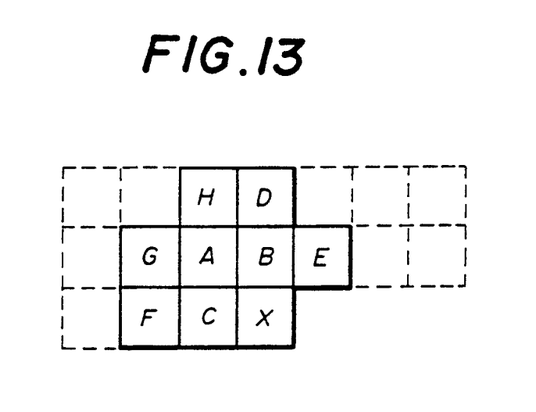
FIG. 13 is a diagram showing a template of another type used by the template making part.
Figure 14:
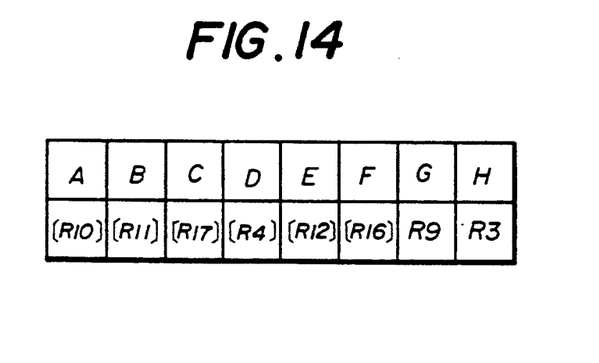
FIG. 14 is a diagram showing a template table of another type produced by the template making part.

FIG. 12 shows a template which is used by the template making part 1 of FIG. 9 in the above case. In the template shown in FIG. 12, the seventeen reference pixels therein are divided into a group of fixed reference pixels and a group of variable reference pixels. The fixed reference pixels are located at fixed locations of the template and labeled A through F. The variable reference pixels are located in the template at the remaining locations thereof which correspond to the locations of the eleven counters R1-R3, R5-R9, and R13-R15. Two of the remaining locations thereof are selected from among those of the variable reference pixels. FIG. 13 shows a template which is used as the initial value of the template table. In this template, the locations labeled G and H are selected from the locations of the variable reference pixels corresponding to the locations of the counters R9 and R3. FIG. 14 shows a template table which is produced in accordance with the template shown in FIG. 13. The reference pixels labeled A through F in this template table are fixed and not subjected to the updating.

Figure 15:
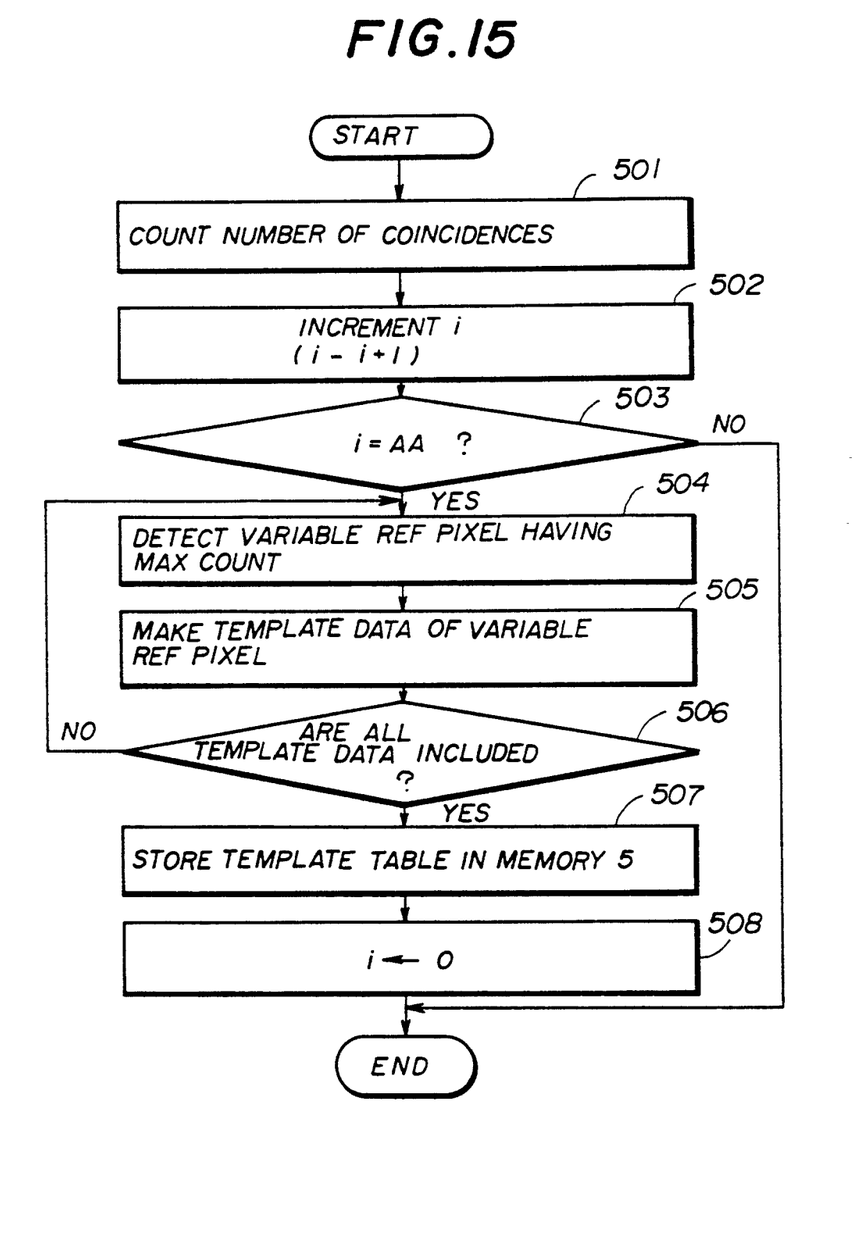
FIG. 15 is a flow chart for explaining another template producing process according to the present invention.

FIG. 15 shows a template producing process which is performed by the template making part 1 of the image compression and decompression apparatus shown in FIG. 9.

Step 501 in a flow chart shown in FIG. 15 increments, whenever the color for one of the variable reference pixels coincides with the color for the target pixel, a count value of color coincidence in a corresponding counter (from among the counters R1-R3, R5-R9, and R13-R15), and allows that counter to hold the incremented count value. Step 502 increments a count value "i" (i=i+1) each time the step 501 is performed. This procedure is repeated with respect to a prescribed number AA of pixels on three successive scanning lines. Step 503 checks whether the count value "i" is smaller than or greater than the number AA.

After the detection is performed in step 503, if i>AA, the template producing process ends. If i≦AA, the count values of the counters corresponding to the reference pixels are arrayed in ascending order from a maximum value to a minimum value. Then, step 504 detects a variable reference pixel corresponding to a counter having the maximum count value from among the counters R1-R3, R5-9, and R13-R15. Step 505 places a template data with respect to one reference pixel (which is detected in step 504) into the template table at a portion corresponding to the maximum count value as shown in FIG. 13. After the template data with respect to one reference pixel is placed into the template table, the counter having the maximum count value is reset so that the maximum count value held by the counter is set to zero.

Step 506 checks whether or not all the template data with respect to eight reference pixels are included in the template table. If it is detected in step 506 that no template data is included in the template table, steps 504 and 505 are performed again as described above. If all the template data are included in the template table, step 507 stores a template table in the template memory 5 in accordance with the thus updated template data. Step 508 resets the count value i to zero. Then, the template producing process ends.

In the embodiment shown in FIG. 15, all the variable reference pixels are updated each time all of the pixels lying on three successive scanning lines are encoded or decoded. However, when local portions having similar characteristics continue to appear in a wide range of image data, locations corresponding to some of the variable reference pixels remain unchanged. In such a case, it is not necessary to update all the variable reference pixels each time the pixels in three successive scanning lines are processed. Instead, it is possible to perform the update procedure for the variable reference pixels under a certain condition. Since the number of variable reference pixels being updated is reduced, the processing time needed to produce a template table can be shortened further, thus enabling a higher processing speed.

Figure 16:
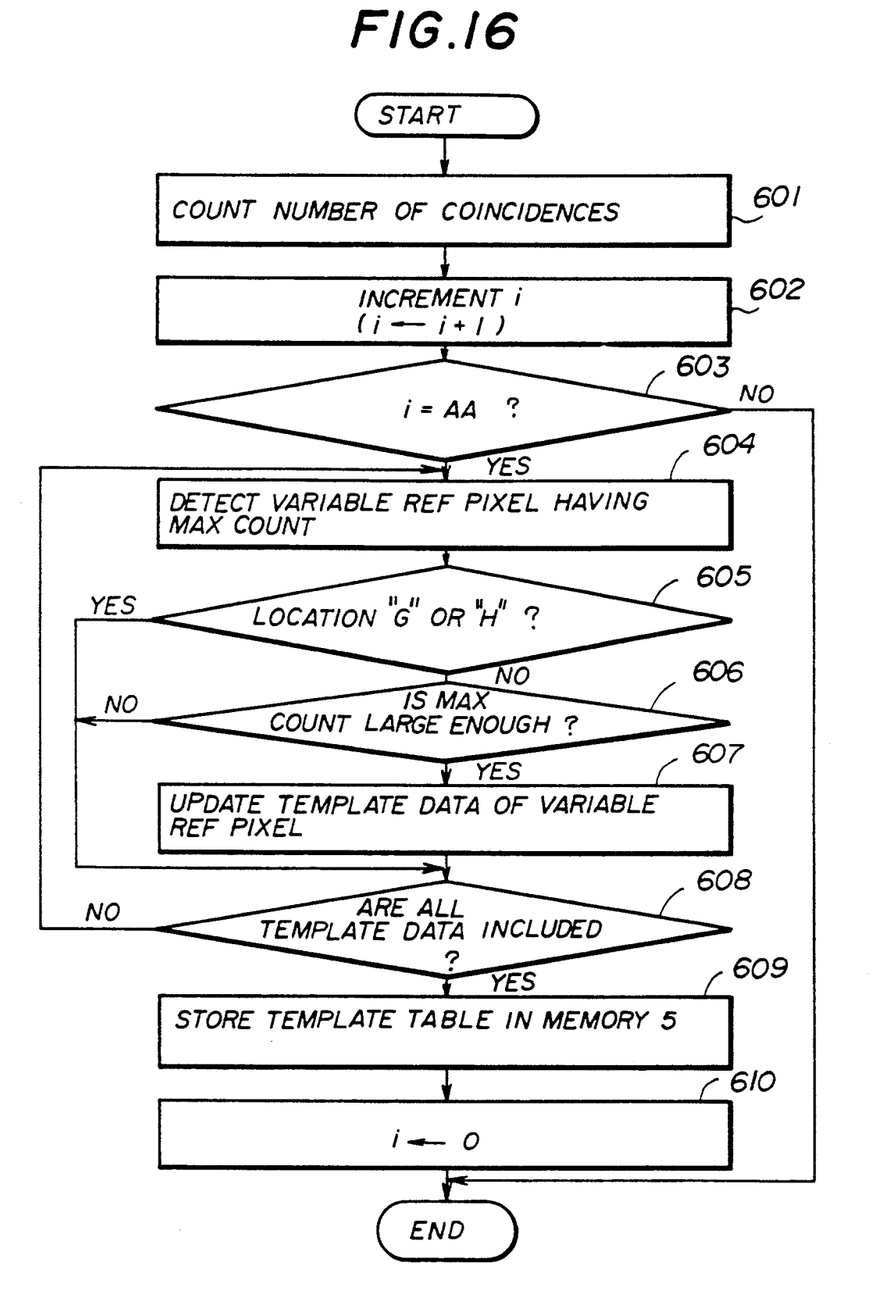
FIG. 16 is a flow chart for explaining still another template producing process according to the present invention.

FIG. 16 shows a template producing process performed in the above described case by the template making part 1 of the image compression and decompression apparatus shown in FIG. 9.

Step 601 in a flow chart shown in FIG. 16 increments, whenever the color for one of the variable reference pixels coincides with the color for the target pixel, a count value of color coincidence in a corresponding counter (from among the counters R1-R3, R5-R9, and R13-R15), and allows that counter to hold the incremented count value. Step 602 increments a count value "i" (i=i+1) each time the step 601 is performed. The above mentioned procedure is repeated until a prescribed number AA of pixels on three successive scanning lines are processed. Step 603 checks whether the count value "i" is smaller than or greater than the number AA.

After the detection is performed in step 603, if i>AA, the template producing process ends. If i≦AA, the count values of the counters corresponding to the reference pixels are arrayed in ascending order from a maximum value to a minimum value. Then, step 604 detects a variable reference pixel corresponding to a counter having the maximum count value from among the counters R1-R3, R5-9, and R13-R15. Step 605 checks whether or not a location of the variable reference pixel being detected in step 604 corresponds to either a location labeled G or a location labeled H in the template shown in FIG. 13.

If step 605 detects that the location of the variable reference pixel does not correspond as described above, step 606 detects whether or not the maximum count value of the counter corresponding to the detected variable reference pixel is greater than twice the count value stored in a counter corresponding to the location G.

If step 606 detects that the maximum count value is large enough, step 607 places a template data with respect to one reference pixel (which is detected in step 604) into a corresponding portion of the template table as shown in FIG. 14. After the template data with respect to one reference pixel is placed into the template table, the counter having the maximum count value is reset so that the maximum count value held by the counter is set to zero.

Step 608 checks whether or not all the template data with respect to two variable reference pixels are included in the template table. If it is detected in step 608 that no template data is not included in the template table, steps 604 through 608 are performed again as described above. If all the template data are included in the template table, step 609 stores a template table in the template memory 5 in accordance with the thus updated template data. Step 610 resets the count value i to zero. Then, the template producing process ends.

If step 605 detects that the location of the detected variable reference pixel corresponds to either the location G or H, step 608 is performed while steps 605 through 607 are not. If step 606 detects that the maximum count value is not great enough, step 608 is performed while step 607 is not.

In the above described embodiments, the template with respect to the target pixel of image data is updated each time pixels in three scanning lines are encoded or decoded. However, it should be noted that the present invention is not limited to such an update timing. Also, even though eight reference pixels are included in the template shown in FIG. 7, or six fixed reference pixels and two variable reference pixels are included in the template shown in FIG. 13, or the reference pixels are selected from among the seventeen pixels preceding the target pixel, it should be noted that the present invention is not limited to such specific numbers of pixels. Also, it should be noted that the present invention is not limited to the condition which is used in step 607 of FIG. 16 as the requirement condition for updating the template data.

Further, the present invention is not limited to the above described embodiments, and variations and modifications may be made without departing from the scope of the present invention.

What is claimed is:

1. An image processing system for image compression in which a template is produced from an image to be processed with respect to each pixel so that the image is encoded into a compressed image by using the template, said system comprising:

template making means for carrying out a template producing process so that a template is produced from an image with respect to one target pixel in said image, said template containing a prescribed number of reference pixels selected from among an array of pixels preceding the target pixel on a plurality of scanning lines including a current scanning line, said reference pixels having respective colors which have been detected;

storage means for storing the colors of the reference pixels in the template produced by said template making means;

state detection means for detecting a state index of the template from the colors of the reference pixels stored in said storage means by referring to a state index table in which correspondence between values of the state index and states of colors of the reference pixels is pre-defined; and encoding means for encoding the target pixel by carrying out an arithmetic encoding process in accordance with the state index detected by said state detection means, so that a compressed image is generated from said image, said template producing process carried out by said template making means comprising steps of:

counting the number of color coincidences between a color of one of said pixels in said array and a color of the target pixel with respect to each of said pixels in said array;

repeating said counting step until a count number which is the same as the number of pixels on the successive scanning lines is reached;

selecting one reference pixel having a maximum count number of color coincidences from among said pixels in said array;

updating a corresponding template data of the template table by the maximum count number of said selected reference pixel;

repeating said selecting and updating steps until all template data corresponding to the prescribed number of reference pixels are updated in the template table; and storing the template table in said storage means, each of the colors of the reference pixels being described by corresponding template data in the template table.

2. An image processing system according to claim 1, wherein a template, in which locations of reference pixels relative to the target pixel and initial values of template data corresponding to the respective reference pixels are pre-defined, is used to encode the image when the template producing process is initially performed.

3. An image processing system according to claim 1, wherein said template making means produces a template in which the reference pixels are divided into a group of fixed reference pixels lying at fixed locations relative to the target pixel and a group of variable reference pixels, only template data corresponding to said variable reference pixels being updated when the template producing process is carried out.

4. An image processing system according to claim 3, wherein a template, in which locations of reference pixels relative to the target pixel and initial values of template data corresponding to the respective reference pixels are pre-defined, is used to encode the image when the template producing process is initially performed.

5. An image processing system according to claim 3, wherein a template data corresponding to one reference pixel having the maximum count value of color coincidences is updated only when the maximum count number is greater than a prescribed value and a location of the reference pixel with respect to the target pixel does not correspond to one of prescribed locations of the variable reference pixels.

6. An image processing system for image decompression in which a template is produced from an image to be processed with respect to each pixel so that the image is decoded into a reconstructed image by using the template, said system comprising:

template making means for carrying out a template producing process so that a template is produced from an image with respect to one target pixel in said image, said template containing a prescribed number of reference pixels selected from among an array of pixels preceding the target pixel on a plurality of scanning lines including a current scanning line, said reference pixels having respective colors which have been detected;

storage means for storing the colors of the reference pixels in the template produced by said template making means;

state detection means for detecting a state index of the template from the colors of the reference pixels stored in said storage means by referring to a state index table in which correspondence between values of the state index and states of colors of the reference pixels is pre-defined; and decoding means for decoding the image with respect to each target pixel by carrying out an arithmetic decoding process in accordance with the state index detected by said state detection means, so that a reconstructed image is generated from said image, said template producing process carried out by said template making means comprising steps of:

counting the number of color coincidences between the color of one of said pixels in said array and a color of the target pixel with respect to each of said pixels in said array;

repeating said counting step until a count number which is the same as the number of pixels on the successive scanning lines is reached;

selecting one reference pixel having a maximum count number of color coincidences from among said pixels in said array;

updating a corresponding template data of the template table by the maximum count number of said selected reference pixel;

repeating said selecting and updating steps until all template data corresponding to the prescribed number of reference pixels are updated in the template table; and storing the template table in said storage means, each of the colors of the reference pixels being described by corresponding template data in the template table.

7. An image processing system according to claim 6, wherein a template, in which locations of reference pixels relative to the target pixel and initial values of template data corresponding to the respective reference pixels are pre-defined, is used to decode the image when the template producing process is initially performed.

8. An image processing system according to claim 6, wherein said template making means produces a template in which the reference pixels are divided into a group of fixed reference pixels lying at fixed locations relative to the target pixel and a group of variable reference pixels, only template data corresponding to said variable reference pixels being updated when the template producing process is carried out.

9. An image processing system according to claim 8, wherein a template, in which locations of reference pixels relative to the target pixel and initial values of template data corresponding to the respective reference pixels are pre-defined, is used to decode the image when the template producing process is initially performed.

10. An image processing system according to claim 8, wherein a template data corresponding to one reference pixel having the maximum count number of color coincidences is updated only when the maximum count number is greater than a prescribed value and a location of the reference pixel with respect to the target pixel does not correspond to one of prescribed locations of the variable reference pixels.

* * * * *